United States Patent [19]

Itoh

[11] Patent Number: 5,760,912
[45] Date of Patent: Jun. 2, 1998

[54] IMAGE FORMING APPARATUS CAPABLE OF PROVIDING APPROPRIATE MARGIN

[75] Inventor: Tetsuya Itoh, Okazaki, Japan

[73] Assignee: Minolta Co., Ltd., Osaka, Japan

[21] Appl. No.: 544,564

[22] Filed: Oct. 18, 1995

[30] Foreign Application Priority Data

Oct. 19, 1994 [JP] Japan ................. 6-253554
Sep. 25, 1995 [JP] Japan ................. 7-246059

[51] Int. Cl.⁶ ................................. H04N 1/21
[52] U.S. Cl. ............... 358/296; 358/451; 382/286
[58] Field of Search ................. 358/296, 451,
358/453, 452, 471, 474, 486, 494; 382/286,
293, 294, 295; 395/783, 105; 399/182,
186–190, 362

[56] References Cited

U.S. PATENT DOCUMENTS

| | | | |
|---|---|---|---|
| 4,707,745 | 11/1987 | Sakano | 358/283 |
| 5,105,283 | 4/1992 | Forest et al. | 358/401 |
| 5,220,431 | 6/1993 | Yamagguchi | 358/296 |
| 5,231,516 | 7/1993 | Kamon et al. | 358/449 |
| 5,243,439 | 9/1993 | Jacobus et al. | 358/448 |
| 5,289,570 | 2/1994 | Suzuki | 395/114 |
| 5,530,560 | 6/1996 | Nakajima | 358/453 |

FOREIGN PATENT DOCUMENTS

64-62075  3/1989  Japan.
6-113105  4/1994  Japan.

*Primary Examiner*—Peter S. Wong
*Assistant Examiner*—Gregory J. Toatley, Jr.
*Attorney, Agent, or Firm*—Sidley & Austin

[57] ABSTRACT

A plurality of originals are successively read by an image scanner, and the read image data are stored in an image memory. A page layout control portion calculates maximum width and maximum length of an image output frame based on the read image data. A region defined by the maximum width and the maximum length to which the image data is to be output, is set for a sheet of paper, in accordance with a designated layout. The stored image data is successively output by a printing portion to the image output frame positioned on each sheet of paper.

21 Claims, 20 Drawing Sheets

FIG.14
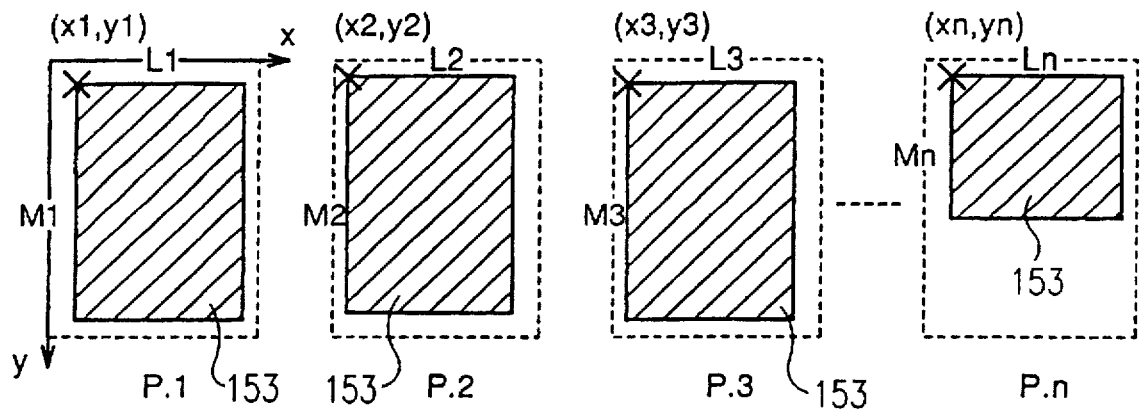
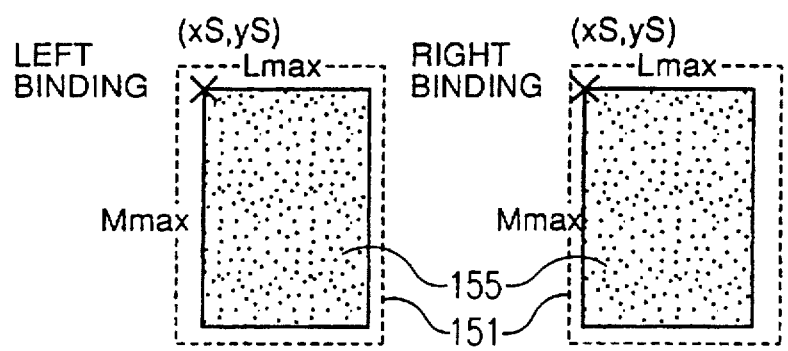
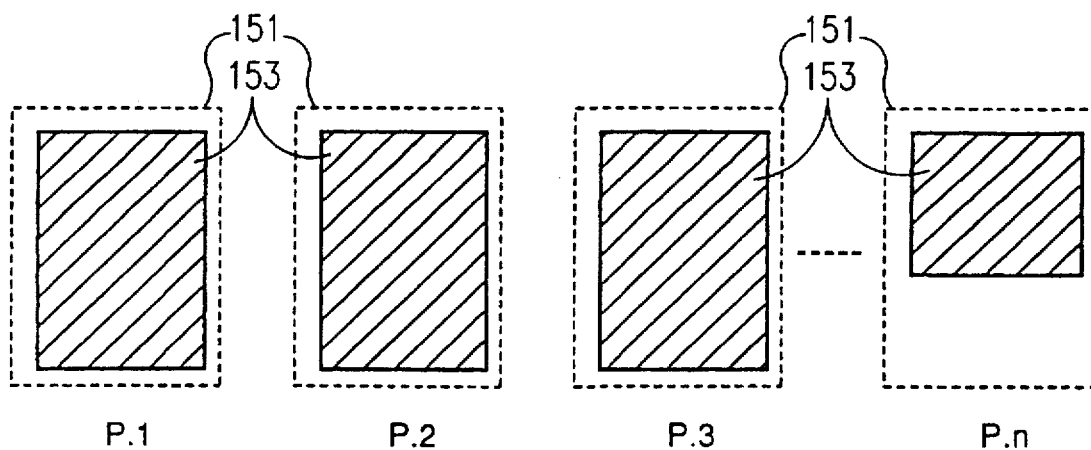

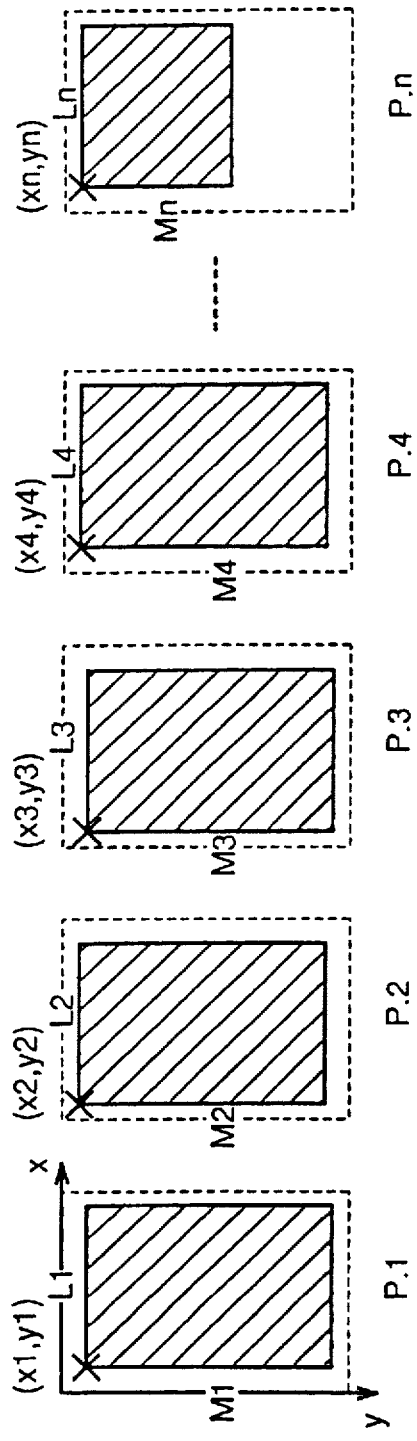
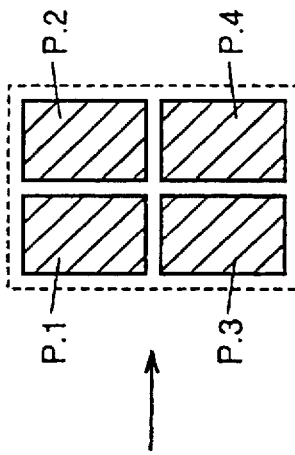
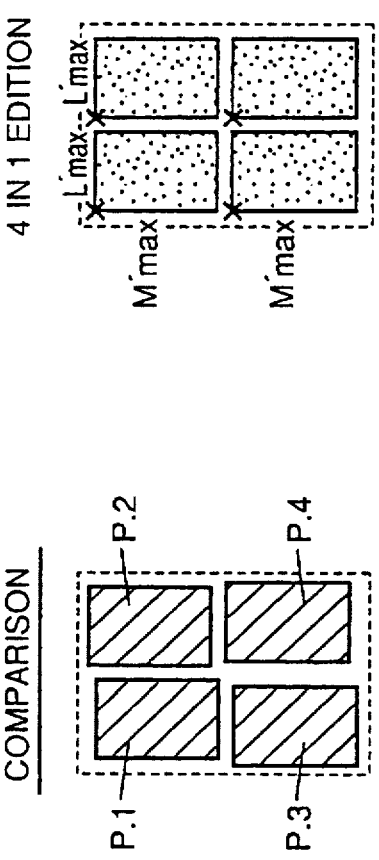
FIG.20

IMAGE FORMING APPARATUS CAPABLE OF PROVIDING APPROPRIATE MARGIN

BACKGROUND OF THE INVENTION

1. Field of the Invention

The present invention relates to an image forming apparatus and, more specifically to an image forming apparatus for outputting images on a sheet of paper based on image data read from an original.

2. Description of the Related Art

An image forming apparatus reading image data from an original and outputting images on a sheet of paper based on the read image data, which has a function of forming a margin of a prescribed size when outputting the images on the sheet, is known.

In the above described apparatus, a margin of a preset prescribed size is formed by reducing the original as a whole (image data corresponding to the original as a whole), or by shifting position of the output of the original as a whole.

Therefore, in the above described apparatus, a margin of a prescribed size is formed regardless of the position or size of the image portion (for example, characters and pictures) of the original. Therefore, dependent on the position or size of the image portion, it may possible that the position of the output image portion is extremely biased, or the position of the output is outside of the size of the sheet. When one document is to be prepared by reading a plurality pages of originals, outputting images of the originals, and binding (or book-binding), the appearance of the finished document as a whole may possibly be unsatisfactory, since the position of the output of the image portion may differ from page to page.

SUMMARY OF THE INVENTION

An object of the present invention is, in an image forming apparatus which reads image data from an original and outputs image on a sheet of paper based on the images data, to form appropriate margins on the sheet of paper in accordance with the size of the image portion of the original, when the images are to be output on the sheet.

Another object of the present invention is to align positions of the output of the image portions of respective pages, when the originals include a plurality of pages to be read and output to sheets of paper.

According to one aspect of the present invention, the image forming apparatus extracts an image portion of an original based on read image data of the original, positions the image portion such that the margins have a prescribed ratio, based on the size of the extracted image portion and the size of an output sheet, and outputs the image portion to the sheet in accordance with the positioning. Therefore, appropriate margins can be formed on the sheet in accordance with the size of the image portion of the original.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 is an illustration supplementing the description of the flow charts shown in FIGS. 11 to 13.

FIG. 20 shows a concept of 4 in 1 edition in which original images of four pages are output juxtaposed on one sheet of paper.

DESCRIPTION OF THE PREFERRED EMBODIMENTS

Figure 1:
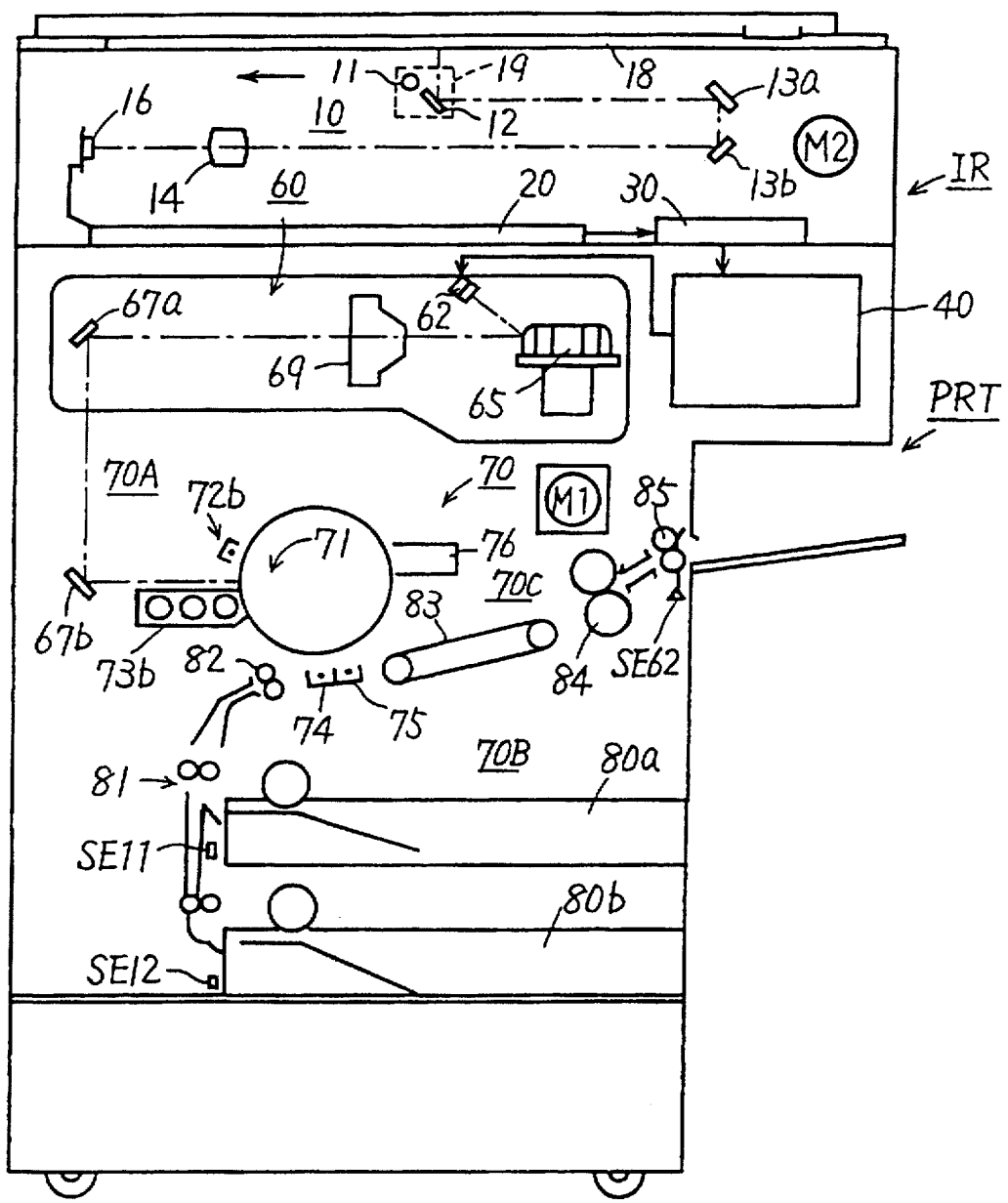
FIG. 1 is a cross section showing a structure of a copying machine implementing the image forming apparatus in accordance with one embodiment of the present invention.

FIG. 1 is a cross section showing the whole structure of a copying machine implementing the image forming apparatus in accordance with one embodiment of the present invention.

Referring to the figure, a copying machine 1 includes a scanning system 10 for reading an original and converting to an image signal; an image signal processing portion 20 for processing the image signal transmitted from scanning system 10; a memory unit 30 for storing image data input from image signal processing portion 20 in a memory; an optical system 60 for directing a laser beam from a semiconductor laser 62 to an exposure position of a photoreceptor drum 71 based on the image data input from memory unit 30; and an image forming system 70 for developing a latent image formed by exposure, transferring the developed image on a sheet of paper and fixing the same for forming images.

Scanning system 10, image signal processing portion 20 and so on constitute an image reader IR, and printing portion 40, optical system 60, image forming system 70 and so on constitute a printer apparatus PRT.

Scanning system 10 includes an exposure lamp 11 and a first mirror 12 incorporated in a scanner 19 moving under a platen glass 18, a second mirror 13a, a third mirror 13b, a condenser lens 14, a photoelectric converting element 16 employing for example, a CCD array, a scan motor M2 and so on.

Image signal processing portion 20 processes image signals output from photoelectric converting element 16, detects size of the original sheet or the like, and provides image data to memory unit 30. Details of image signal processing portion 20 and memory unit 30 will be described later.

Printing portion 40 provides the transmitted image data to semiconductor laser 62. Optical system 60 includes semiconductor laser 62, a polygon mirror 65 for deflecting the laser beam, a main lens 69, a reflection mirror 67a, a reflection mirror 67b and so on. Image forming system 70 includes a development and transfer system 70A, a conveying system 70B and a fixing system 70C. The development and transfer system 70A includes, as shown in FIG. 1, a photoreceptor drum 71 which is driven to rotate counterclockwise and a corona charger 72b, a developing unit 73b, a transfer charger 74, a copy paper separation charger 75 and a cleaning portion 76 arranged successively from the upstream side in the direction of rotation, around the drum. The developing unit 73b contains a two component developer including toner and carrier.

Transfer system 70B includes cassettes 80a and 80b containing sheets of paper, size detection sensors SE11 and SE12 for detecting paper size, a paper guide 81, a timing roller 82 and a conveyer belt 83.

Fixing system 70C includes a fixing roller 84 for conveying a sheet of paper while maintaining the sheet in thermal pressure contact, a discharge roller 85 and a detection sensor SE62 for detecting discharge of the sheet of paper.

Figure 2:
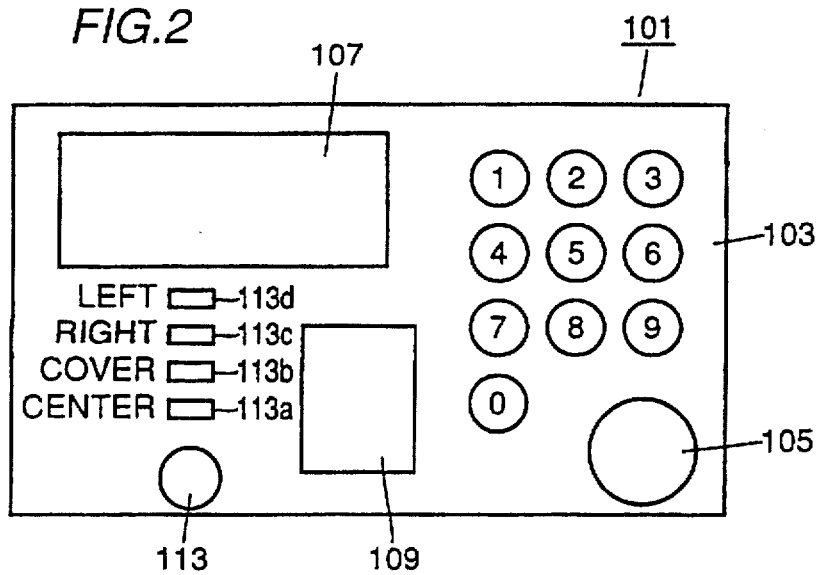
FIG. 2 shows an operation panel of the copying machine shown in FIG. 1.

FIG. 2 shows an operation panel of the copying machine shown in FIG. 1. Referring to the figure, operation panel 101 includes ten keys 103 for inputting various numerical values, a print key 105 for starting printing, setting key group 109 for setting paper size, magnification, copy mode and the like to desired values, a binding mode setting key 113 for setting a desired binding mode, mode display portions 113a to 113d for displaying the set binding mode, and a liquid crystal display 107 for displaying various information for copying operations, including number of copies and copying magnification.

Figure 3:
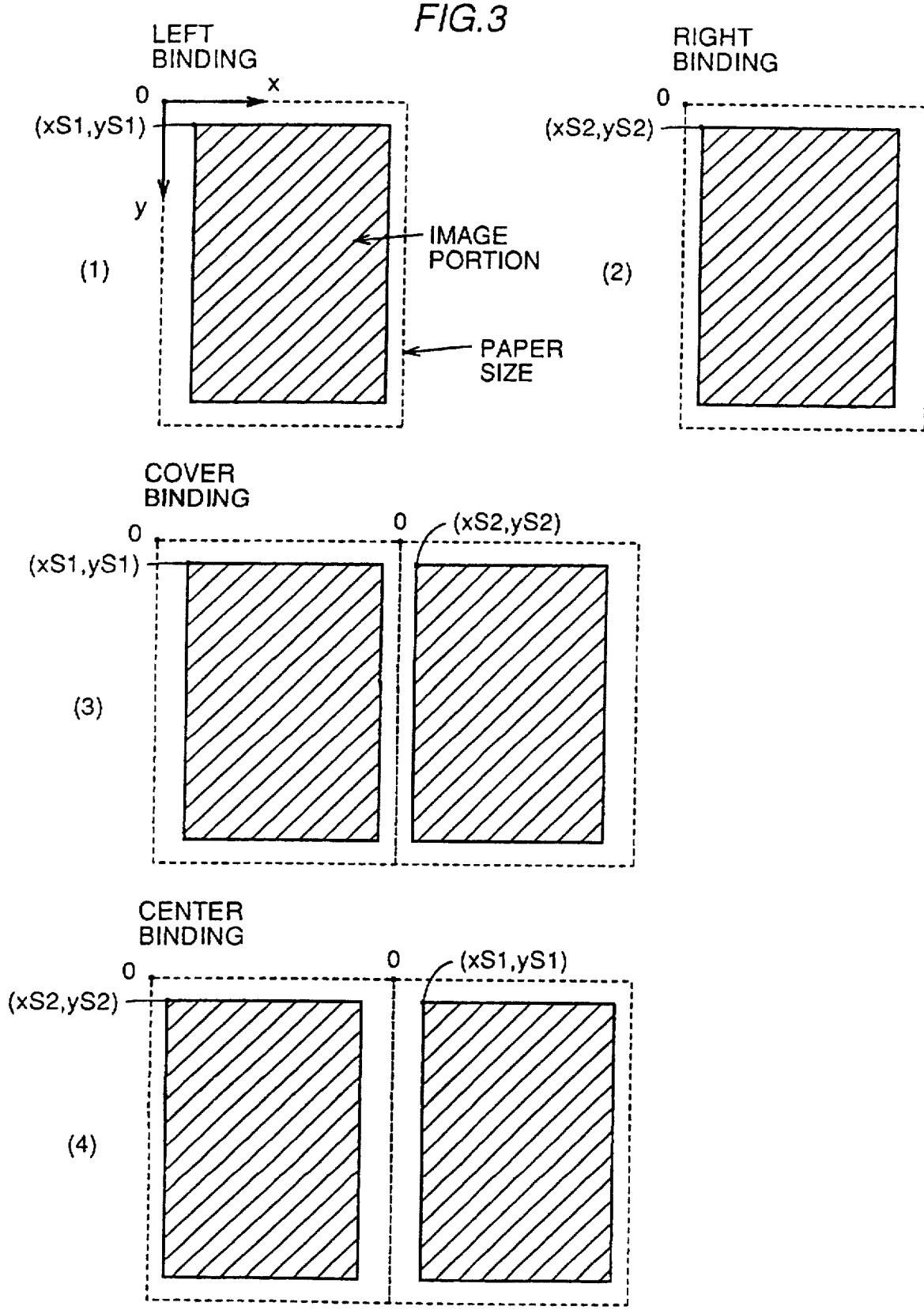
FIG. 3 shows concepts of various binding modes set by the operation panel shown in FIG. 2.

FIG. 3 shows a layout of images in various binding modes set by the binding mode setting key 113 on the operation panel shown in FIG. 2.

Referring to the figure, (1) shows an image layout in a left binding mode. In the left binding mode, the image portion of an original represented by the hatched portion is positioned on a sheet of paper of which size is represented by the dotted line such that there are left and right margins allotted to have the ratio of 2:1 and upper and lower margins allotted equally.

Layout (2) shows an image layout in a right binding mode in which left and right margins are allotted to have the ratio of 1:2 and upper and lower margins allotted equally.

Layout (3) shows an image layout in image layout of a cover binding mode in which the left portion for cover binding has the same image layout as in the left binding mode shown in (1) and the right portion has the same image layout as in the right binding mode shown in (2).

Figure 4:
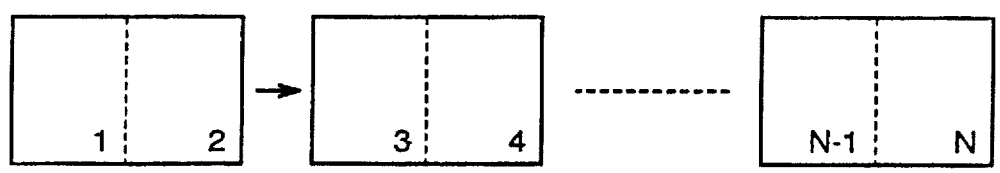
FIG. 4 is an illustration of output in accordance with a cover binding mode.
Figure 5:
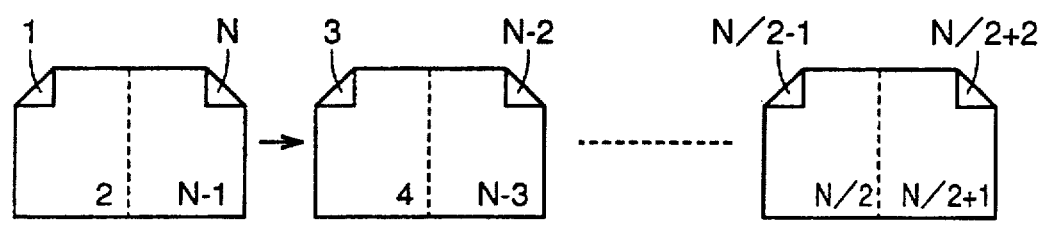
FIG. 5 is an illustration of output in accordance with a center binding mode.

Here, in the cover binding mode, a first page of the original is output to a left half of the sheet, the second page is output to the right half, the third page is output to the left half of the next sheet, the fourth page is output to the right half and in a similar manner, the last page (N) of the original is output, as shown in FIG. 4. Each sheet on which the images are printed is folded at the center so that the printed surface faces outward, and thus folded sheets are successively stacked. The stacked sheets are bound on the side opposite to the folded portion (when the number of total pages is even).

Layout (4) shows an image layout in a center binding mode in which the left portion has the same image layout as in the right binding mode shown in (2), and the right portion has the same image layout as the left binding mode shown in (1).

In the center binding mode, the first page of the original is output to a rear surface of the left half of a sheet, the second page is output to the front surface thereof, the last page (N) of the original is output to the rear surface of the right half of the sheet, the next to last page is output to the front surface thereof; the third page is output to the rear surface of the left half of the next sheet, the fourth page is output to the front surface thereof, the third from the last page of the original is output to the rear surface of the right half of the sheet, the fourth from the last page is output to the front surface thereof, and in a similar manner, all the pages of the original are output. The sheets on which images are printed in this matter are successively stacked, folded at the center and bound at the folded portion. Thus, bookbinding is finished with the sheets bound at the center and the pages are arranged in order (when the number of total pages is a multiple of 4).

Figure 6:
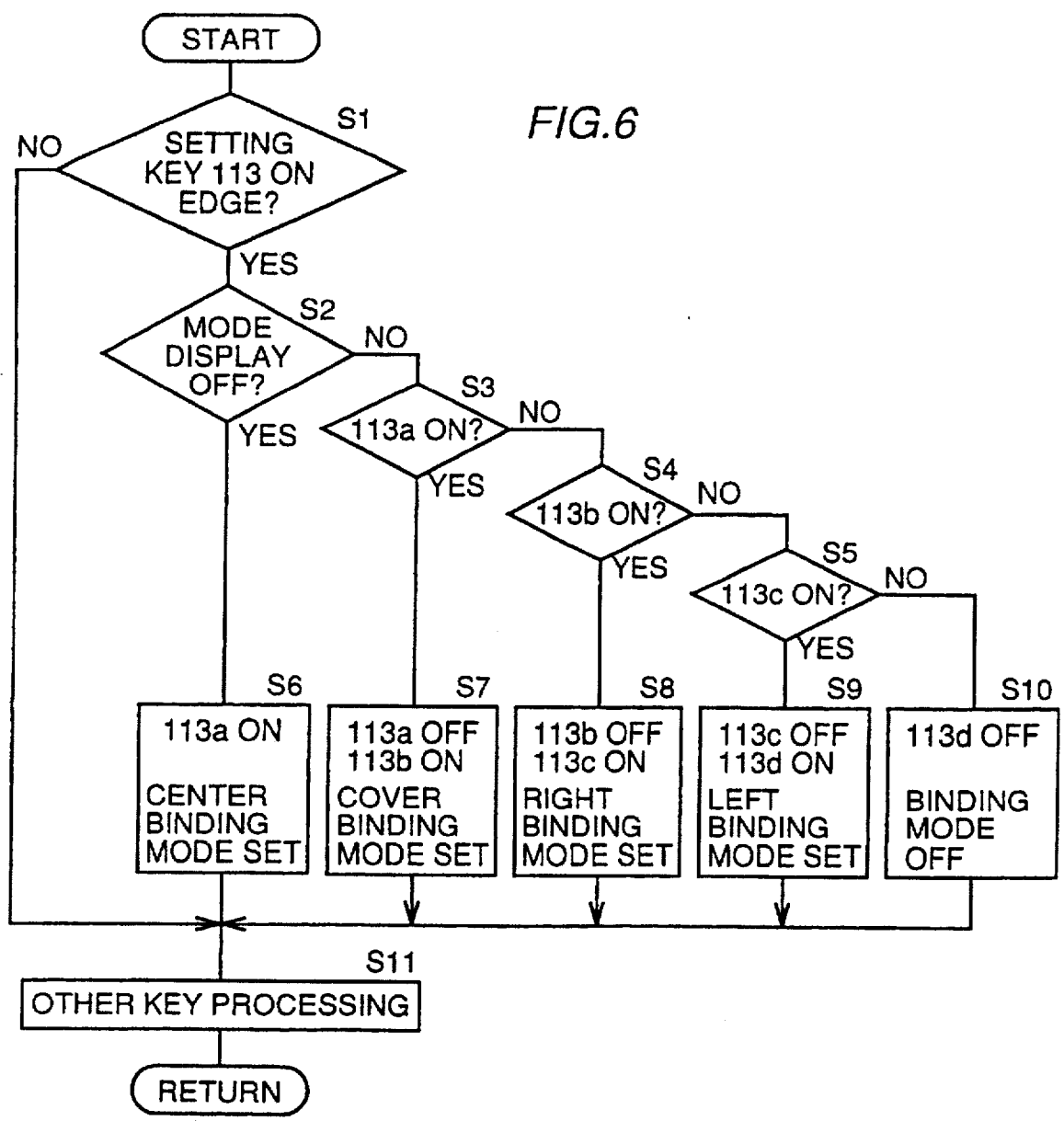
FIG. 6 is a flow chart of a key input processing routine for the operation panel shown in FIG. 2.

FIG. 6 is a flow chart of a key input processing routine for the operation panel shown in FIG. 2.

First, in step S1 (hereinafter, the term step is omitted and simply referred to by "S") whether or not on edge of binding mode setting key 113 is on edge is determined. Here, "on edge" means switching of the key state from off to on.

If key 113 is not on edge (NO in S1), the flow proceeds to S11 in which other key processes are executed, and then this routine is completed. Meanwhile, if key 113 is one edge (YES in S1), the states of mode display portions 113a to 113d are determined in S2 to S5.

Here, if mode display portions 113a to 113d are all off (YES in S2), it means that the binding mode is canceled at present (that is, the machine is in the normal mode), and therefore mode display portion 113a is lit and the center binding mode is set (S6). If mode display portion 113a is on (YES in S3), it means that the center binding mode is set at present, and hence mode display portion 113a is turned off, mode display portion 113b is turned on and the mode is switched to the cover binding mode (S7). In a similar manner, the states of mode display portions 113a to 113d, that is, the setting of a binding mode, is determined and, in accordance with the state, turning on/off of mode display portions 113a to 113d and change selection of a setting of the binding mode are performed (S2–S10). Thereafter, other key processes are performed in S11 and the routine is completed.

More specifically, in the copying machine 1 in accordance with the present embodiment, every time the mode setting key 113 is pressed, the binding mode is successively switched, in the order of center binding mode→cover binding mode→right binding mode→left binding mode→binding mode off (normal mode), and corresponding to the set mode, one of the mode display portions 113a to 113d is turned on (for the normal mode, all display portions are turned off).

Figure 7:
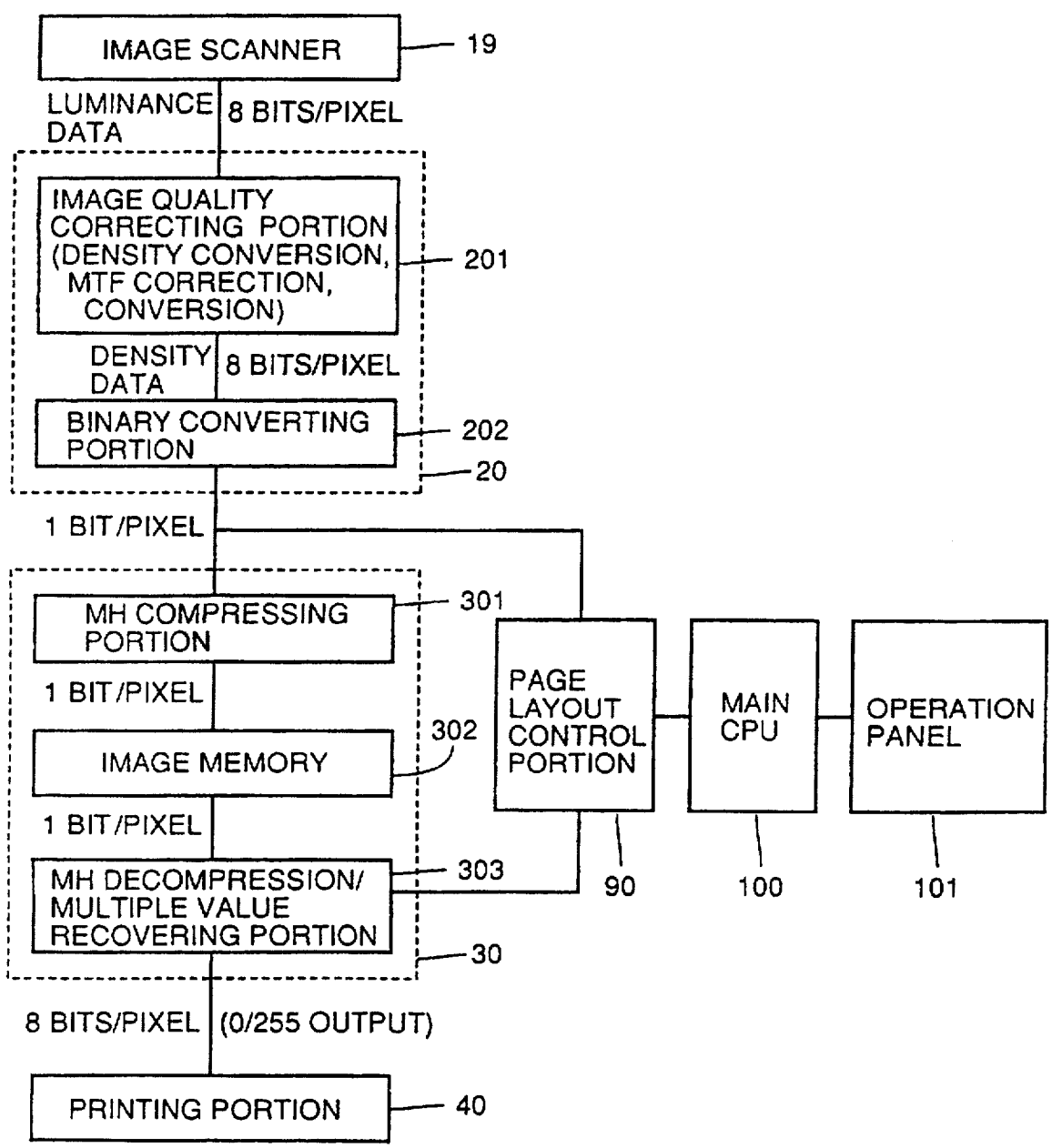
FIG. 7 is a block diagram showing a structure for controlling the copying machine of FIG. 1.

FIG. 7 is a block diagram showing a structure for controlling the copying machine 1 shown in FIG. 1. Referring to the figure, image information read by an image scanner 19 is output as luminance data represented by 8 bits for one pixel which is subjected to image quality correction such as density conversion, MTF correction and γ conversion in an image quality correcting portion 201 in image processing portion 20, and thereafter output as density data represented by 8 bits per one pixel.

Thereafter, pixel data which has been converted to binary values based on a prescribed threshold value in a binary converting portion 202 is input bit by bit to an MH compressing portion 301 and a page layout control portion 90. In MH compressing portion 301, compression and encoding are performed in accordance with the MH method, and data which has been compressed and encoded is stored in image memory 302. Meanwhile, the data which has been converted to binary value in binary converting portion 202 is subjected to a prescribed process also in the page layout control portion 90. The structure and the process content of the page layout control portion 90 will be described later.

When the image data stored in image memory 302 is to be printed out, the data is decompressed in an MH decompression/multiple value recovering portion 303, and data having multiple values represented by 8 bits per one pixel is recovered. To MH decompression/multiple value recovering portion 303, a control signal from page layout control portion 90 is input. Thereafter, in printing portion 40, data having multiple values is printed in accordance with the control signal from page layout control portion 90.

Figure 8:
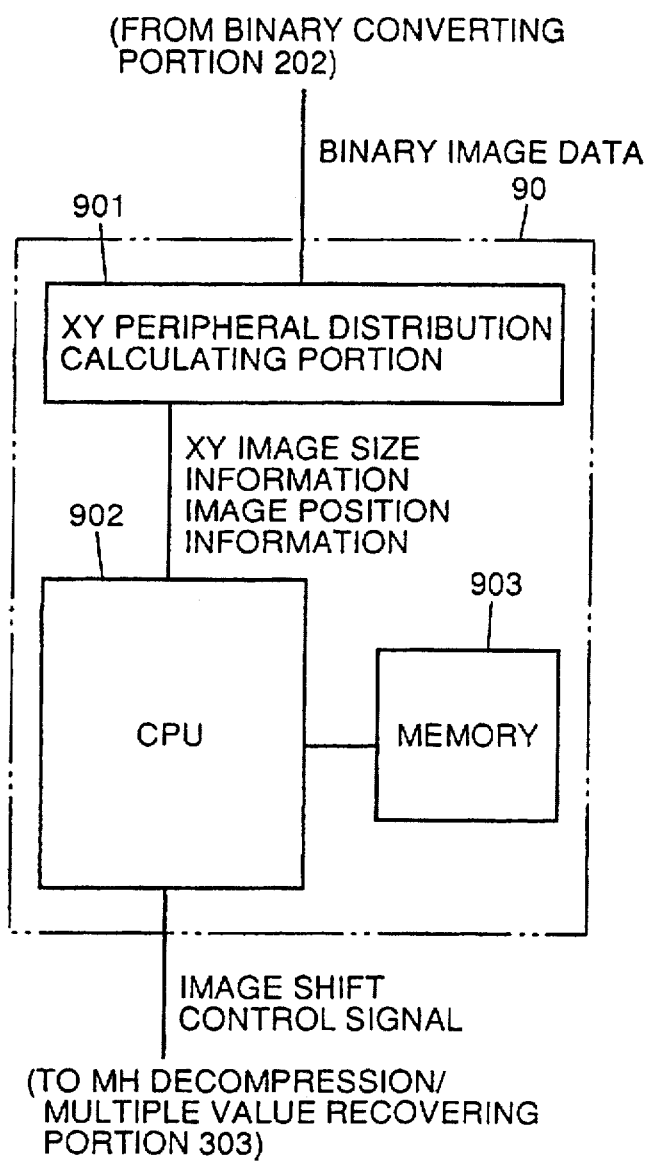
FIG. 8 is a functional block diagram of a page layout control portion 90 shown in FIG. 7.

FIG. 8 is a function block diagram of the page layout control portion 90 shown in FIG. 7. Referring to the figure, an XY peripheral distribution calculating portion 901 calculates peripheral distribution of black pixels of an original which is read, based on the binary image data input from the binary converting portion 202, so as to identify the position and size of the image portion of the original. Thereafter, this information is output to a CPU 902.

Figure 9:
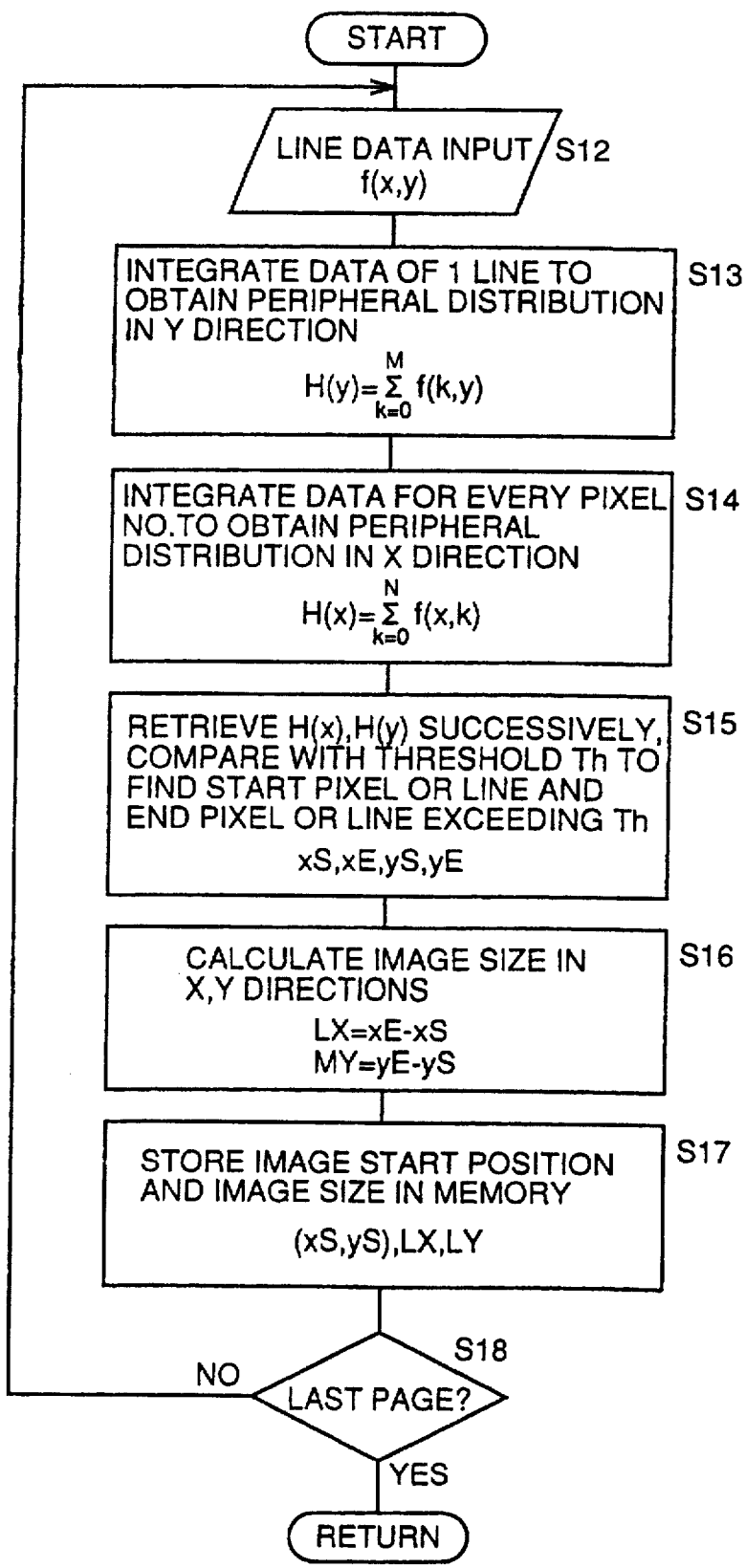
FIG. 9 is a flow chart showing the content of processing by an XY peripheral distribution calculating portion 901 shown in FIG. 8.
Figure 10A:
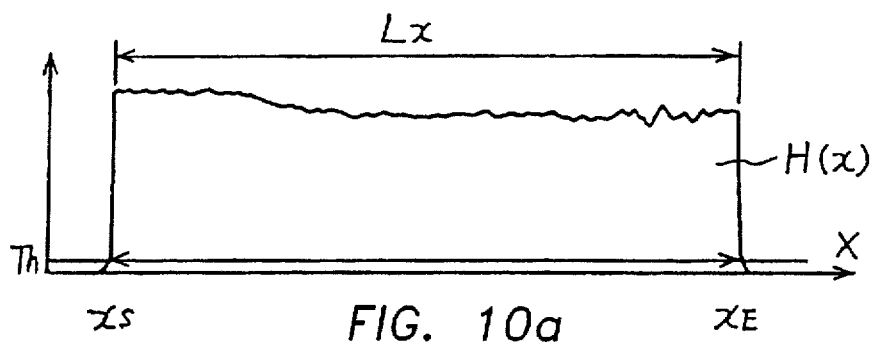
FIG. 10 shows the concept of peripheral distribution of image data for illustrating the flow of FIG. 9.
Figure 10C:
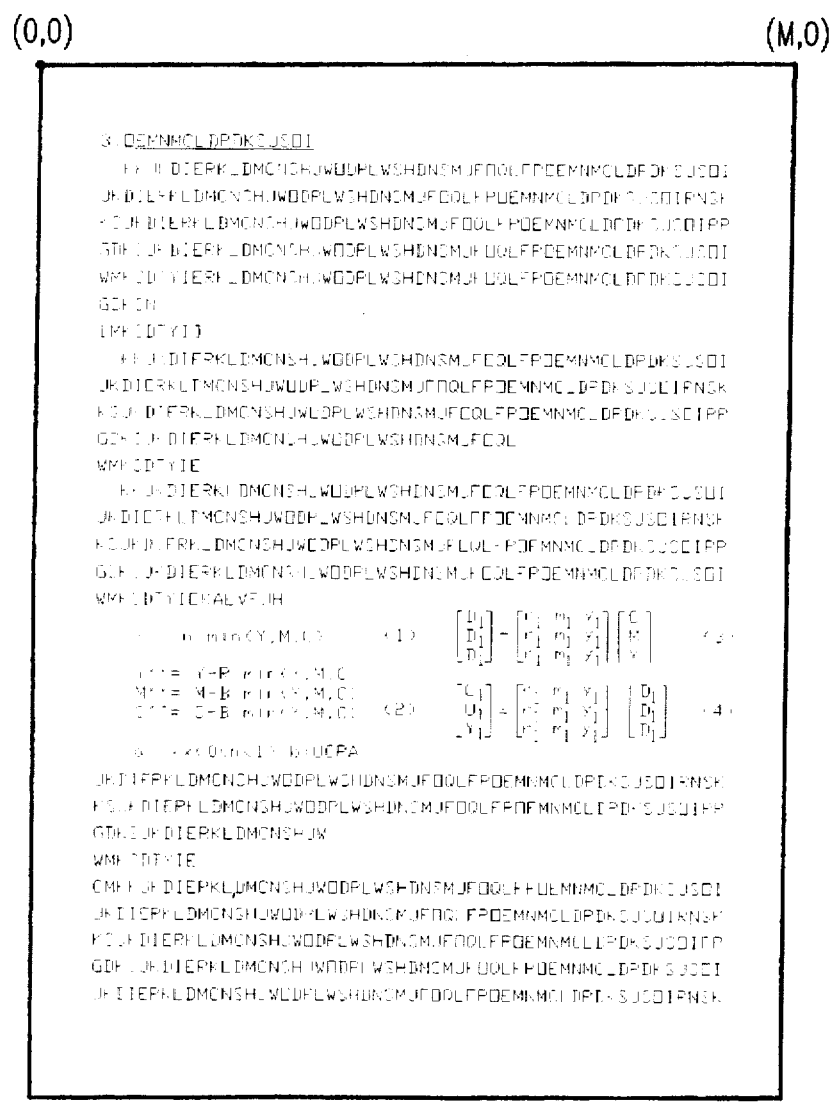
Figure 10B:
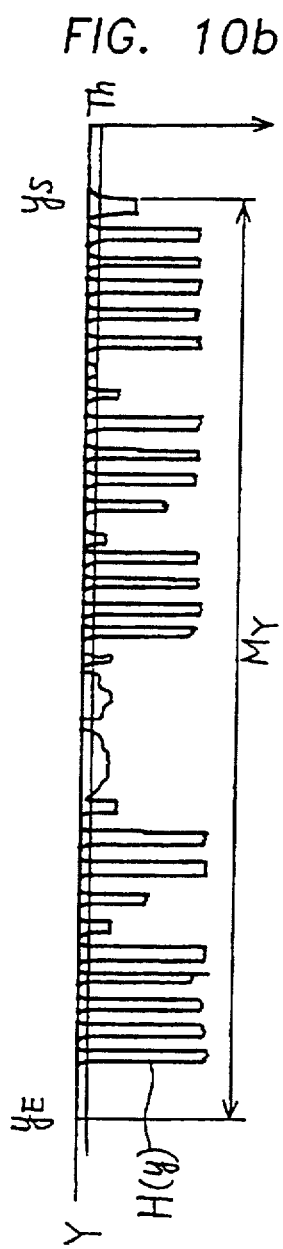

FIG. 9 is a flow chart showing the processing in XY peripheral distribution calculating portion 901 and FIG. 10 shows the concept of peripheral distribution of original image data, related to the processing.

First, when originals including a plurality of pages are read, in S12, image data value f(x, y) of the first line of the image data corresponding to the first page of the read originals is input.

Here, f(x, y) represents image data value for every pixel at a data position (x, y) in a coordinate system in which a point (O, O) on the upper left corner of the original shown in FIG. 10 is regarded as the origin. Assuming that there are M pixels in one line and there are N lines, then $$x=1, 2 \ldots M$$

$$y=1, 2 \ldots N.$$

Then, in S13, the data of one line are integrated, and a peripheral distribution H(◊) of the black pixels in Y direction, that is, the lengthwise direction of the original, is found in accordance with the following expression.

$$H(y) = \sum_{k=0}^{M} f(k, y)$$

Then, in S14, the data are multiplied for every pixel number (x coordinate), and a peripheral distribution H(x) of the black pixels in the X direction, which is the widthwise direction of the original, is found in accordance with the following expression.

$$H(x) = \sum_{k=0}^{N} f(x, k)$$

The peripheral distribution of black pixels of one page of an original obtained in this manner corresponds to such a histogram as shown in FIG. 10, when plotted.

When calculation of the peripheral distribution of one page of the original is completed, in S15, the peripheral distribution H(x) in the X direction and the peripheral distribution H (y) in the Y direction are each compared with a prescribed threshold value (Th). Based on the value of the peripheral distribution exceeding the threshold value, a start pixel xS, a start line yS, an end pixel xE and an end line yE are found. Based on these values, an position 153 of a image portion in the page is calculated.

In S16, based on the data calculated in S15, an image size in each of the X and Y directions, that is, width LX and length MY of an image portion 153 are calculated in accordance with the following equations.

$$LX=xE-xS$$

$$MY=yE-yS$$

An image start position (xS, yS) of an image portion 153 and the size LX, MY of the image portion 153 calculated in this manner are stored in memory 903.

The above described processing is repeated page by page, until the last page of the originals page by page, and this process of calculation is terminated.

Though the above described calculation processing is performed in XY peripheral distribution calculating portion 901 which is a hard logic circuit in the present embodiment, it goes without saying that this process may be performed by the CPU 902, that is, by means of a software.

Then, CPU 902 calculates the maximum size both in the X and Y directions, from the information of size and position of the image portion 153 for each of the pages stored in memory 903. Then, CPU 902 determines a region defined by the extracted maximum size in the X and Y directions, as an image output frame 155 for the originals, and based on the size of the image output frame 155 and on the size of the sheet of paper 151, calculates an image start position of the image portion 153 in accordance with the set binding mode. In accordance with the image start position of the image portion, CPU 902 provides an image shift control signal to MH decompression/multiple value recovering portion 303 in accordance with the information of each page, so as to output image data corresponding to the image portion 153 of each page of the originals.

Figure 11:
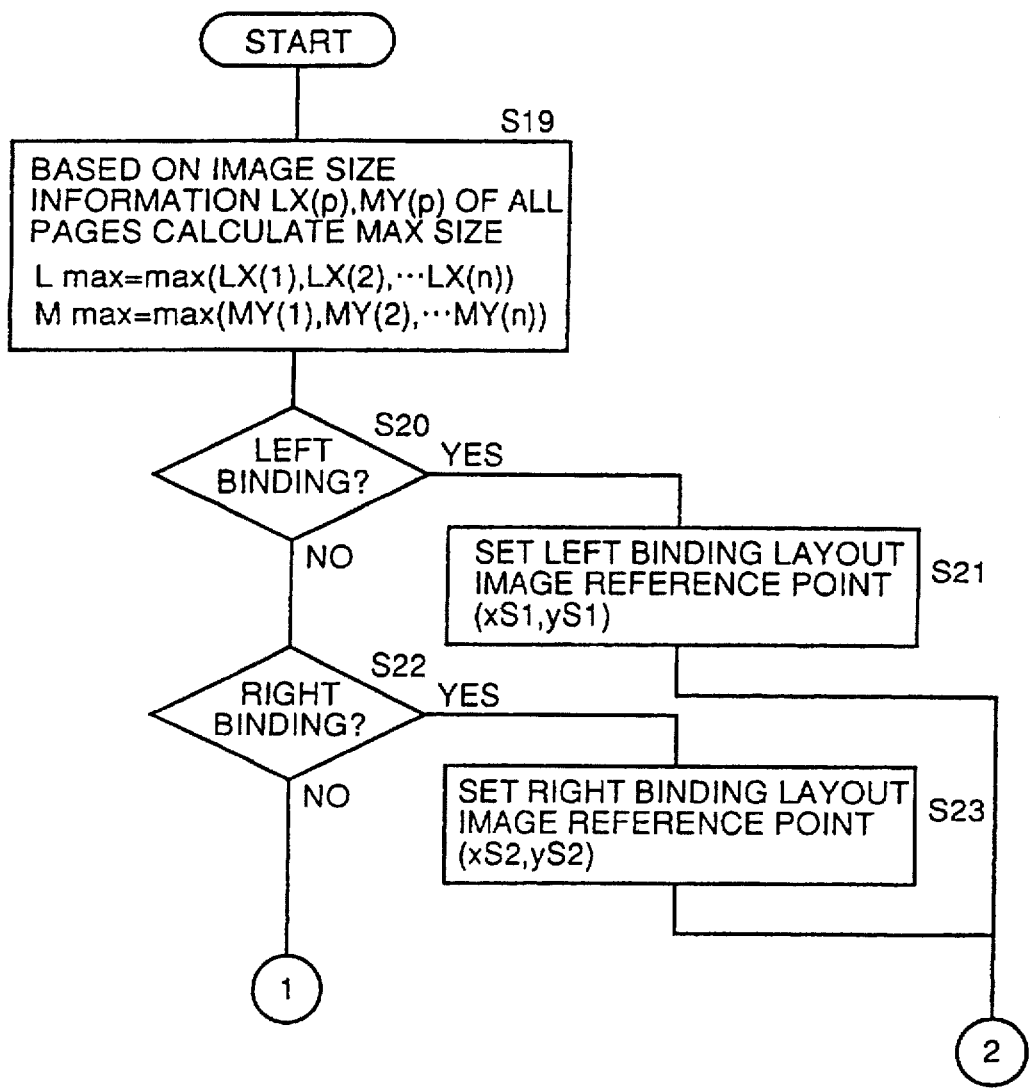
FIG. 11 is a part of a flow chart of a page layout determining process performed by CPU 902 of FIG. 8.
Figure 12:
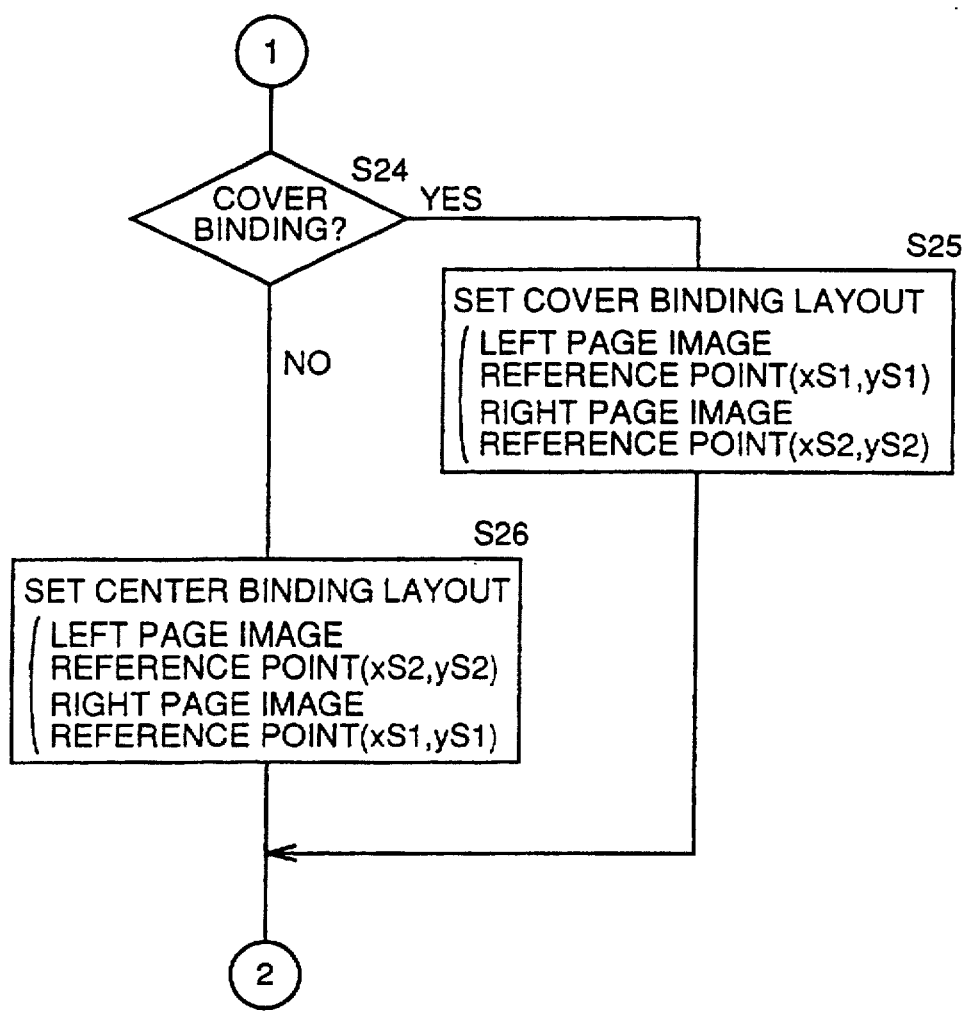
FIG. 12 shows another part of the flow chart of page layout determining process performed by the CPU 902 shown in FIG. 8.
Figure 13:
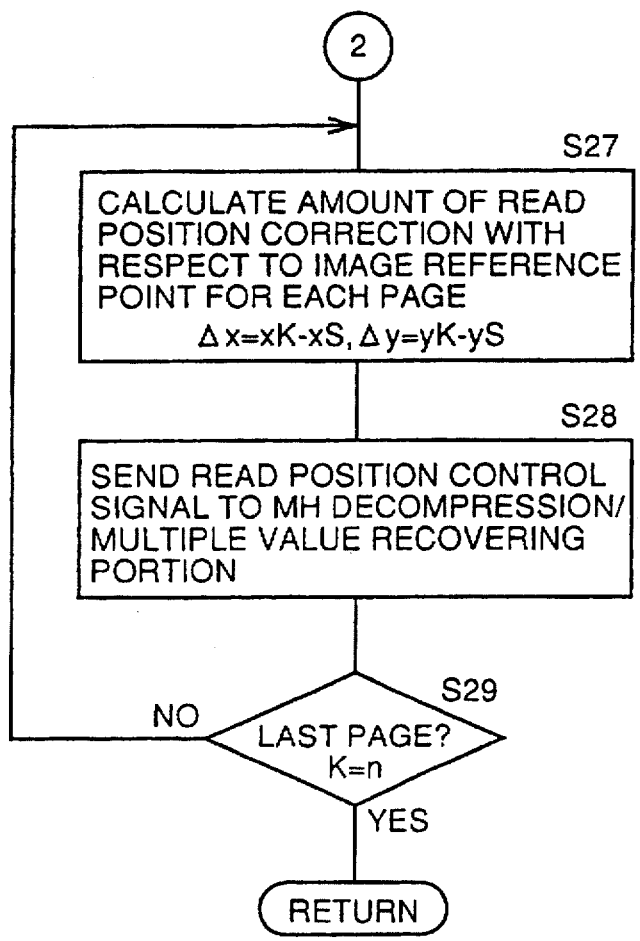
FIG. 13 shows a still further part of the flow chart of page layout determining process performed by the CPU 902 of FIG. 8.
Figure 15:
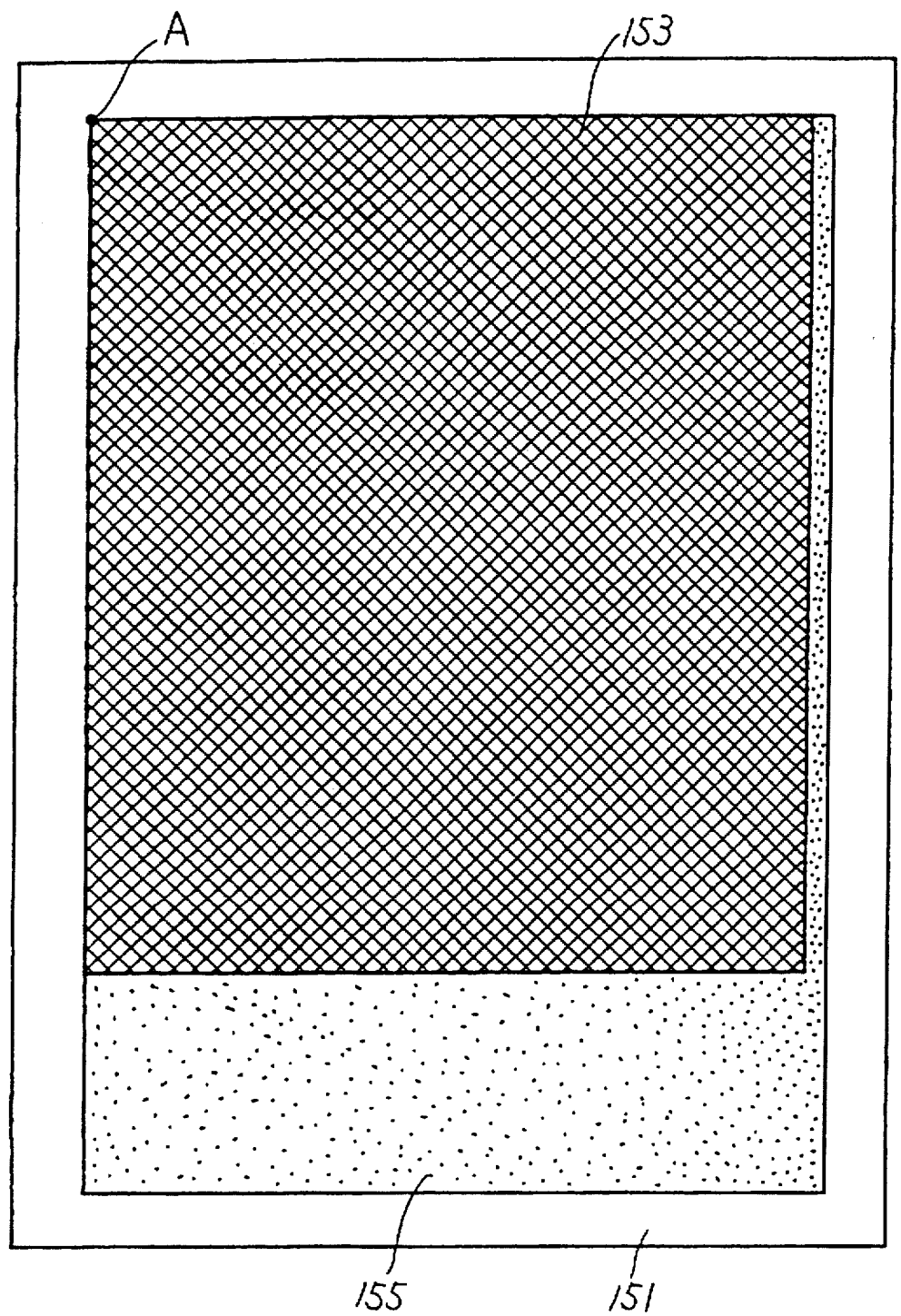
FIG. 15 shows the concept of a page layout for illustrating the flow of FIGS. 11 to 13.

FIGS. 11 to 13 are flow charts showing the process of image layout determination performed by CPU 902. FIG. 14 shows the concept of this processing and FIG. 15 shows the concept of page layout.

First, in S19, based on the size information, that is, LX(p) and MY(p) of the image portion 153 of all the pages of the originals, a maximum size in the X and Y directions is calculated, which is regarded as the image output frame 155 of the originals.

Here, the reference character p represents the page number of the read original, and in FIG. 14, it is assumed that n pages of originals have been read. More specifically, $$Lmax=max(LX(1), LX(2), \ldots, LX(n))$$

$$Mmax=max(MY(1), MY(2), \ldots, MY(n)).$$

Mainly, in the example of FIG. 14, n pages of originals shown at the upper portion are read (FIG. 14(a)), and based on the size information of the image portions 153 in each page, the maximum width (Lmax) and the maximum length (Mmax) of the image portion 153 among the originals is calculated (FIG. 14(b)). In other words, the image portion 153 of any page of the read originals is within the region specified by the maximum size of the image portion 153, that is, within the image output frame 155 (FIG. 15) of the originals.

Then, in S20, whether the set mode is the left binding mode or not is determined. If it is the left binding mode, (YES in S20) in S21, an image reference point (xS1, yS1) is calculated, based on the image output frame of the originals specified in S19 described about so as to set the image layout of the left binding mode. Here, the image reference point serves as a write start position of the image data corresponding to the image portion 153 of each page of the originals, which point is calculated in accordance with the following equation, where the page size is (LX, MY):

$$(xS1, yS1)=(\tfrac{2}{3}*(LX-Lmax), \tfrac{1}{2}*(My-Mmax)).$$

In S27, amounts ΔX and ΔY for correcting read start position with respect to the image reference point are calculated in accordance with the following equations:

$$\Delta x=xK-xS \text{(Here is } xS=xS1\text{)}$$

$$\Delta y=yK-yS \text{(Here is } yS=yS1\text{)}.$$

More specifically, the image start position correction amounts are calculated, and by using the position correction amounts, the write start position of the image data corresponding to the image portion of each page is controlled (FIG. 2). As a result, referring to FIG. 15, for example, even when the image portion 153 of one page of an original differs from the size of the image output frame 155 determined from all the image portions 153 the image portion 153 can be output with the upper left corner of the image portion 153 of the page aligned with point A at the upper left corner of the image output frame 155. More specifically, as in FIG. 14(c), even when the positions of image portion 153 of the read originals differ page by page, the images are output in uniformly aligned layout with the upper left corner of the image portions 153 defined constantly.

In S27, the calculated amounts of read start position correction are transmitted to MH decompression/multiple value recovering portion 303 in S28. The processes of steps S28 and S29 are repeated page by page until the last page of the originals (S29). In this manner, the write start position of the image portions 153 of the respective pages are aligned.

When the set mode is the right binding mode (YES in S22), in S23, image reference point (xS2, yS2) for setting the image layout of the right binding mode is calculated in accordance with the following equation:

$$(xS2, yS2)=(\tfrac{1}{3}*(LX-Lmax), \tfrac{1}{2}*(MY-Mmax)).$$

Thereafter, the same processes (S27–S29) as in the above described left binding mode are performed (except that xS=xS2 and yS=yS2 in this mode).

If the set mode is the cover binding mode (YES in S24), an image reference point for setting the image layout for the cover binding mode is calculated in S25 for each page output to the left half of the sheet and each page output to the right half of the sheet. Here, the image reference point of the left page is calculated by the same equation for calculating the image reference point in the left binding mode described above, and the image reference point of the right page is calculated by the same equation as for the image reference point in the right binding mode described above (however, in the cover binding mode, the size LX of the width direction of the page size (LX, MY) is set to be ½ of the widthwise size of the sheet to which the images are output).

When the set mode is the center binding mode (NO in S24), an image reference point for setting the image layout of the center binding mode is calculated for S26 in each page output to the left half of the sheet and each page output to the right half of the sheet. Here, the image reference point of the left page is calculated by the same equation as for the image reference point in the right binding mode described above, and the image reference point of the right page is calculated by the same equation as for the image reference point in the left binding mode described above (however, in the center binding mode, the widthwise size LX of the page size (LX, MY) is set to be ½ of the widthwise size of the sheet to which the images are output).

Both in the cover binding mode and the center binding mode, the same processes as shown in the left binding mode and the right binding mode above (S27 to S29) follow.

Figure 16A:
FIG. 16 is an illustration showing the effect of the present invention when applied to a processing in cover binding mode.
Figure 16B:
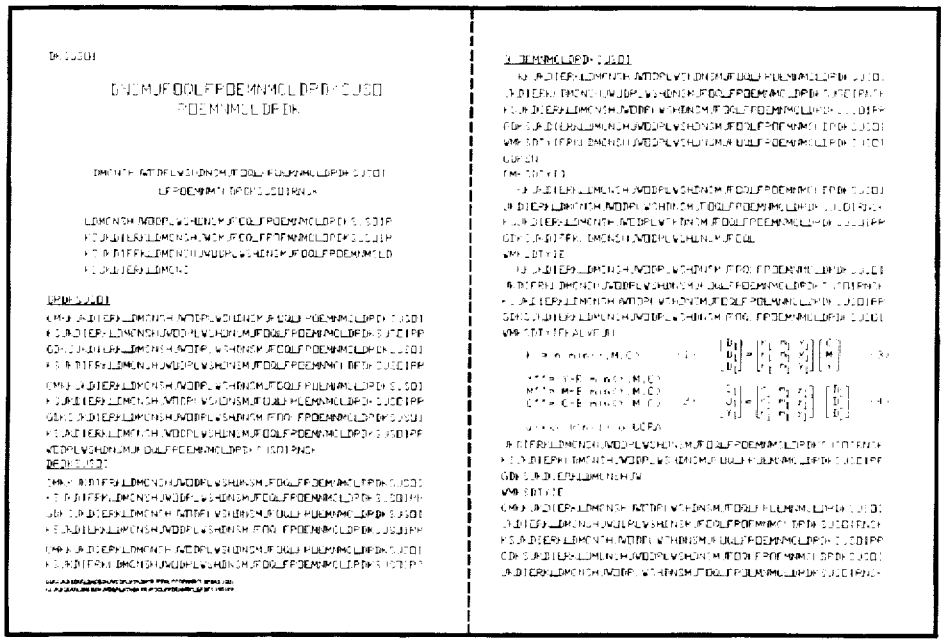

FIG. 16 shows the effect of the present invention when the present invention is applied to a cover binding mode processing. Referring to the figure, if there is not a margin in the left, right upper or lower portion in the original with respect to the image portion and the images are output in the cover binding mode without any processing, the resulting document would be as shown (1) which is not good to look at. Meanwhile, if the processing in accordance with the present invention is performed, even the images of such original can be output with appropriate margins on the left, right and upper and lower portions as shown (2), and hence the output images, as a whole, have a higher quality appearance.

In the above described embodiment, the ratio of the left and right margins is predetermined for each binding mode. However, a desired ratio may be arbitrarily set by an operator through an input from the operation panel 101.

Figure 17:
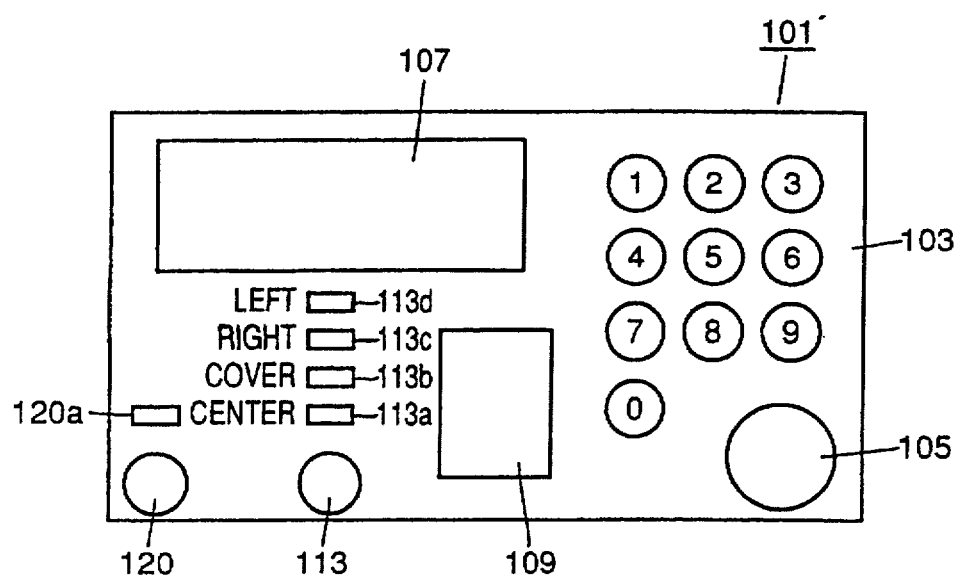
FIG. 17 shows another example of an operation panel of the copying machine shown in FIG. 1.

FIG. 17 shows an example of the operation panel for the apparatus of the above described embodiment, which allows arbitrary setting of the ratio of left and right margins defining the write start position of the image portion of each page of the original. Referring to the figure, operation panel 101' is similar to the operation panel 101 shown in FIG. 2, except that a margin setting key 120 and margin setting display portion 120a are provided.

Figure 18:
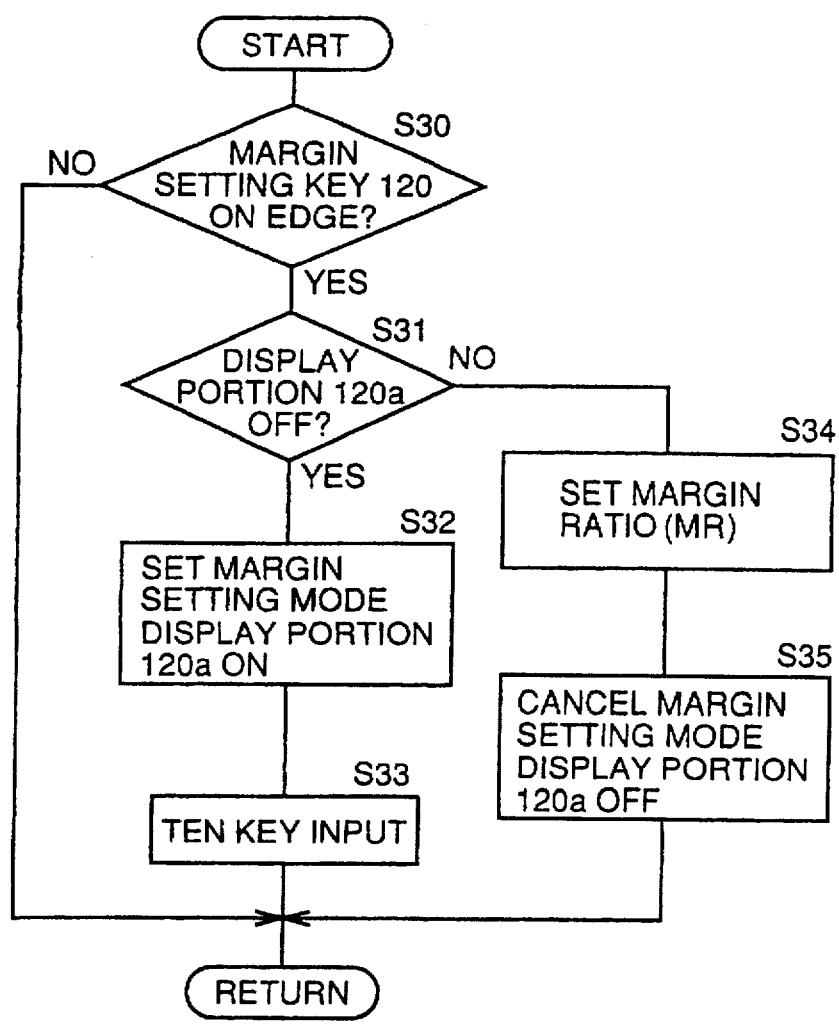
FIG. 18 is a flow chart showing a process routine for setting margin by a margin setting key.

FIG. 18 is a flow chart showing a process routine for setting the margin by the margin setting key 120. First, in S30, whether or not the margin setting key 120 is on edge is determined, and if not, (NO in S30) the following processes are bypassed.

If the margin setting key 120 is on edge detected (YES in S30), in S31, the state of the margin setting display portion 120a is determined. If the margin setting display portion 120a is off (YES in S31), margin setting mode is set, allowing input through ten keys 103 (S33), and margin setting display portion 120a is turned on (S32). When the value of the margin ratio (MR) is input through ten keys 103 by the operator in S33, the data is stored in a memory, not shown, in a main CPU 100, and the process is completed.

Meanwhile, if the margin setting display portion 120a is on in (NO in S31), it is determined that the margin ratio has been already input, and therefore data is extracted from the aforementioned memory, in step S34, and the extracted data is stored in memory 903 of page layout control portion 90. Then, as the margin setting mode is canceled in S35, margin setting display portion 120a is turned off and the process is terminated.

More specifically, if the margin setting key 120 is pressed while the margin setting display portion 120a is on, a margin setting mode is set (margin setting display portion 120a on).

When the value of the margin ratio (MR) is input through the ten keys 103 and the margin setting key 120 is pressed again in the margin setting mode, the input value is set as the margin ratio (MR), and the margin setting mode is canceled (margin setting display portion 120a off).

As for the margin ratio (MR) input through the ten keys 103, it is convenient if the ratio is set to be the same as the ratio of the margin on the side to be bound and the margin on the side not bound in respective binding modes. Namely, in the left binding mode, the side to be bound is the left side of the image, and the right binding mode, it is on the right side of the image.

In the cover binding mode, the side to be bound is on the left side of the image in the page output to the left half of the sheet, while it is on the right side of the image in a page output to the right half of the sheet. In the center binding mode, in contrast to the cover binding mode, the side to be bound is on the right side of the image in the page in which images are output to the left half of the sheet and it is on the left side of the image in a page output to the right half.

Figure 19:
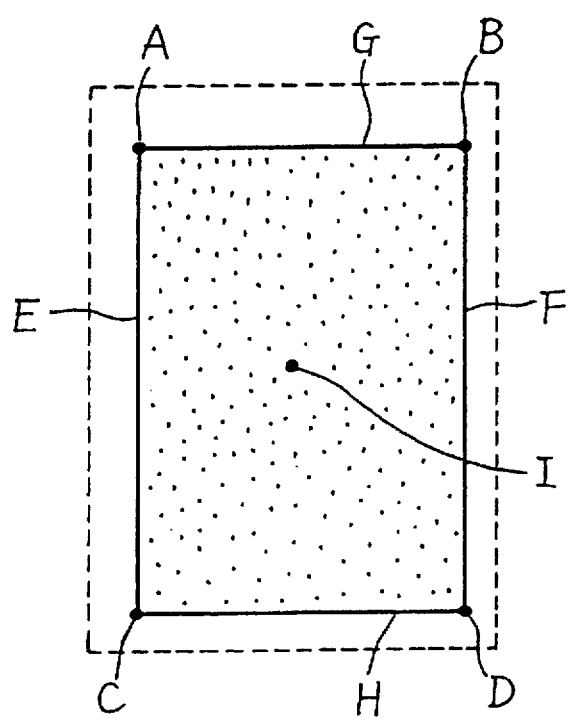
FIG. 19 shows an example of an image reference point when the present invention is applied.
Figure 21:
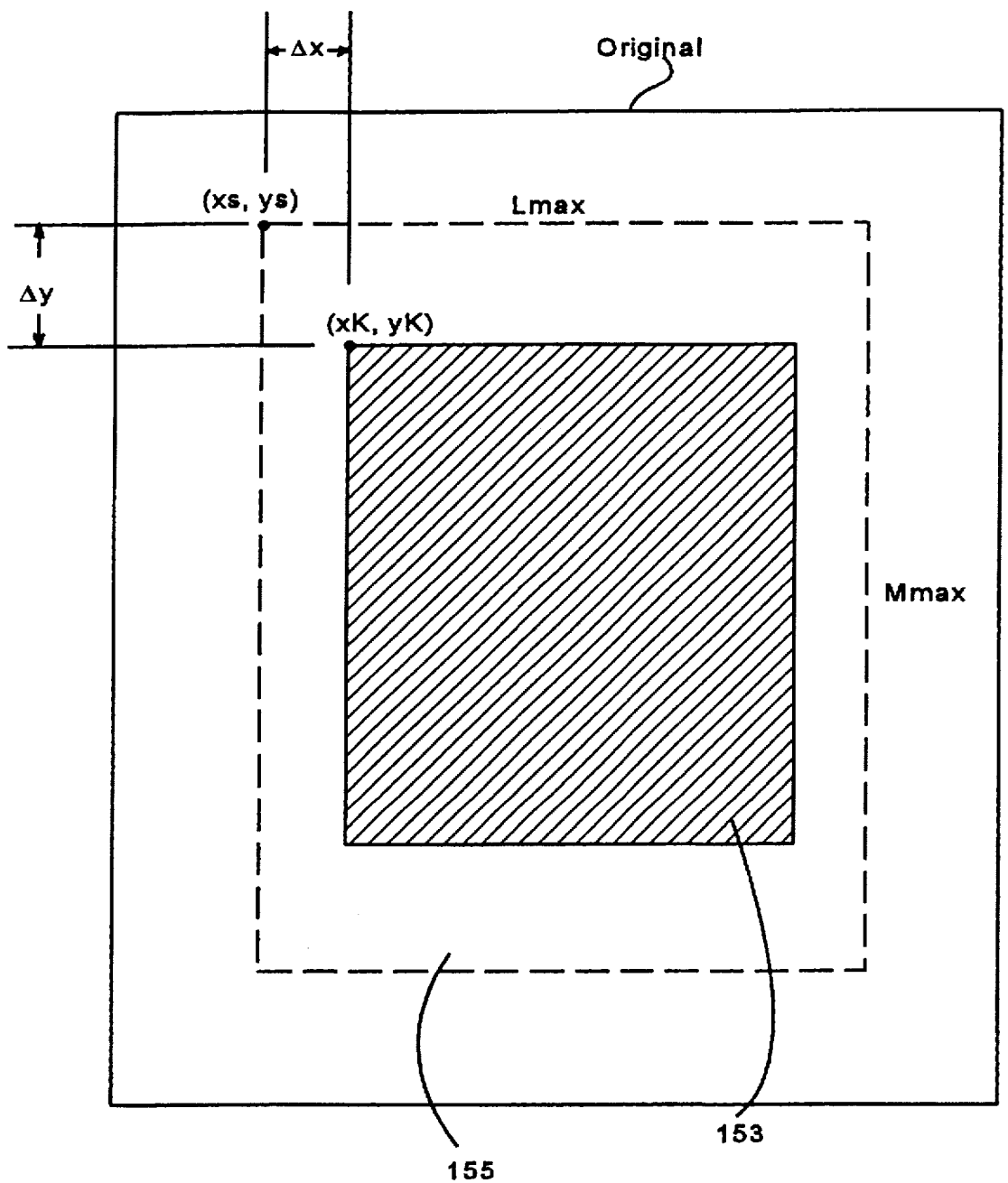
FIG. 21 shows the correlation between an original image portion and an image output frame.

Though the upper left corner of the image portion is used as an image reference point in the above described embodiment, the read image data may be controlled and output with respect to other reference points. Referring to FIG. 19, examples of other reference points include: the upper right corner B, lower left corner C, lower right corner D, left side line E, right side line F, top line G, base line H or center I.

Further, when the read original has image portions 153 divided into two or more, for example, when the original has two columns, there is a space or blank between the columns, and in such a case, the image layout can be controlled based on the position of the center of the space, for example.

Further, the present invention can also be applied to image edition in which originals, including a plurality of pages, are read and images of a prescribed number of pages (N) are output aligned on one sheet (here it is referred to as "N in 1 edition"). FIG. 20 shows a concept of 4 in 1 edition in which original images of four pages are output aligned on one sheet of paper, as an example of N in 1 edition.

Referring to the figure, originals including n pages are read, the maximum width (Lmax) and maximum length (Mmax) of the image portions of the originals, that is, the image output frame, are calculated in the same manner as in the above described embodiment, and reduction ratio to the size L'max and M'max which allows output of four image output frames in one sheet is found. Thereafter, the read image data is reduced by the aforementioned reduction ratio and output, referring to a prescribed point (upper left corner of each image output frame in this example). Thus, the positions of output of the read original images are neatly aligned, and the quality of the output image can be improved as compared with other known methodologies.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:

reading means for reading image data from an original;

image output means for outputting an image to a sheet of paper based on the image data read by the reading means; and image layout control means for extracting an image portion of the original based on the image data of the original read by the reading means, positioning said image portion on a page on a sheet of paper at a determined position, so that formed margins outside the image portion have a prescribed margin ratio for at least a left margin and a right margin with respect to the image portion, the determined position being based on a size of the image portion and a size of said page, and controlling the image output means such that the image portion is output to the page of the sheet of paper in accordance with thus determined position.

2. The image forming apparatus according to claim 1, further comprising:

setting means for setting the margin ratio; wherein said image layout control means positions the image portion on the page of the sheet of paper in accordance with the margin ratio set by said setting means.

3. The image forming apparatus according to claim 1, wherein the layout control means extracts the image portion as a rectangle.

4. The image forming apparatus according to claim 3, wherein the image layout control means extracts a rectangle formed by lines of pixels, wherein the rectangle is defined by a number of black pixels of the image data that exceed a prescribed threshold value for the image portion.

5. The image forming apparatus according to claim 1, wherein, the sheet of paper maintains a single page.

6. The image forming apparatus according to claim 1, wherein, the sheet of paper maintains a plurality of pages, wherein a plurality of image portions are output to a single sheet of paper.

7. An image forming apparatus, comprising:

reading means for reading image data from an original;

image output means for outputting an image to a sheet of paper based on the image data read by said reading means; and image layout control means for extracting an image portion page by page from a plurality of originals based on image data of the originals read by said reading means, positioning the image portions from the originals on one or more sheets of paper at a determined position, wherein the determined position is based upon a size of the image portions extracted from all the plurality of originals, and controlling the image output means such that each image portion of the originals is output in accordance with thus determined position.

8. The image forming apparatus according to claim 7, wherein the image layout control means defines a size of an image output frame to which each image portion is to be positioned, based on the size of the image portions of all the plurality of originals, positions the image output frame on the one or more sheets of paper, based on the size of the defined image output frame and a size of a sheet of paper, so that at least two margins outside the image output frame are formed, each having a size determined in accordance with a prescribed margin ratio, and positions each image portion so that each image portion is within a positioned image output frame.

9. The image forming apparatus according to claim 8, further comprising setting means for setting the margin ratio, wherein the image layout control means positions the image output frame on the a sheet of paper in accordance with the margin ratio set by the setting means.

10. The image forming apparatus according to claim 8, further comprising binding mode selection means for selecting one of a plurality of binding modes, wherein the image layout control means positions the image output frame on a sheet of paper in accordance with the margin ratio set in accordance with a binding mode selected by said binding mode selection means.

11. The image forming apparatus according to claim 10, further comprising:

setting means for setting the margin ratio; wherein the image layout control means positions the image output frame on a sheet of paper in accordance with the margin ratio set by the setting means.

12. The image forming apparatus according to claim 11, wherein the setting means sets the margin ratio of a margin on a side which is to be bound and a margin size on a side which is not to be bound for each of said plurality of binding modes.

13. The image forming apparatus according to claim 10, wherein the plurality of binding modes includes a cover binding mode and a center binding mode.

14. The image forming apparatus according to claim 8, wherein the image layout control means extracts the image portion of each original read by the reading means as a rectangle.

15. The image forming apparatus according to claim 14, wherein the image layout control means extracts a rectangle formed by lines of pixels, wherein the rectangle is defined by a number of black pixels of the image data that exceed a prescribed threshold value for the image portion.

16. The image forming apparatus according to claim 14, wherein the image layout control means defines a size of the image output frame based on a maximum longitudinal dimension and a lateral dimensions of the image portions extracted from all the plurality of originals.

17. The image forming apparatus according to claim 14, wherein the image layout control means positions the image portion of each original on a sheet of paper based on a prescribed point of said image output frame.

18. The image forming apparatus according to claim 17, wherein the prescribed point is the upper left corner of the image output frame.

19. A method of editing an image in an image forming apparatus comprising the steps of:

reading image data from an original;

extracting an image portion of the original based on the read image data;

positioning, based on a size of the image portion extracted and a size of a sheet of paper to which the original is to be output, the image portion on the sheet of paper at a determined position so that margins are formed on the sheet of paper outside the image portion, the margins having a prescribed ratio for at least a left side margin and a right side margin with respect to the image portion; and outputting the image portion extracted to the sheet of paper based on thus determined position.

20. A method of editing an image in an image forming apparatus, comprising the steps of:

reading image data from a plurality of originals;

extracting an image portion page by page from said originals based on the read image data;

positioning each image portion at a determined position on one or more sheets of paper, the determined position being dependent upon a size of the image portions extracted from all of the plurality of originals; and outputting each image portion to one or more sheets of paper in accordance with thus determined position.

21. The method of editing an image in an image forming apparatus according to claim 20, wherein the positioning step further including the steps of:

defining a size of an image output frame for each sheet of paper to which each image portion is to be output, based on the sizes of the image portions of all the plurality of originals, positioning, based on the size of the image output frame defined and the size of one of the one or more sheets of paper to which each image portion is to be output, an image output frame on each sheet of paper so that at least two margins outside the image output frame have a prescribed ratio for a left margin size and a right margin size with respect to the image output frame, and positioning each image portion on the one or more sheets of paper, so that each image portion is within a positioned image output frame.

* * * * *